_United States Patent Office_

3,505,321
Patented Apr. 7, 1970

3,505,321
BASICALLY SUBSTITUTED OXIMES OF 5H-DI-
BENZO-[a,d]10,11-DIHYDRO-CYCLOHEPTENYLI-
DENE AND THEIR PREPARATION
Siegismund Schutz, Wuppertal-Elberhard, and Friedrich
Hoffmeister, Wuppertal-Vohwinkel, Germany, assignors
to Farbenfabriken Bayer Aktiengesellschaft, Lever-
kusen, Germany, a corporation of Germany
No Drawing. Original application Nov. 24, 1965, Ser. No.
509,608, now Patent No. 3,441,608, dated Apr. 29,
1969. Divided and this application Dec. 9, 1968, Ser.
No. 801,891
Int. Cl. C07d 87/40
U.S. Cl. 260—247.5                                    4 Claims

ABSTRACT OF THE DISCLOSURE

Basically substituted oximes of 5H-dibenzo-[a,d]-10,11-dihydro-cycloheptenylidene of the formula:

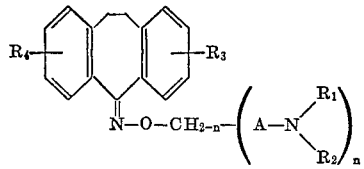

wherein A is a straight or branched chain alkylene of 0–6 carbon atoms, $R_1$ and $R_2$ are each hydrogen or alkyl of 1–8 carbon atoms, which may be linked with one another or with A, such as via an N, S or O hetero atom, $R_3$ and $R_4$ are each hydrogen, alkyl of 1–4 carbon atoms, halogen, hydroxyl, nitro or amino and $n$ is 1 or 2 and pharmaceutically acceptable non-toxic salts possess antidepressive activity in humans, anti-cataleptic activity against pharmacogenically initiated extrapyramidal-motoric irritations and in vitro exhibit a strong spasmolytic effect. Processes for the preparation of these compounds are described.

---

This is a division of application S.N. 509,608, now Patent No. 3,441,608, issued on Apr. 29, 1969.

The present invention relates to new basically substituted oximes of 5H-dibenzo [a,d]-10,11-dihydro-cycloheptenylidene, their non-toxic pharmaceutically acceptable salts and procedure for making same, the new compounds possessing useful pharmacological and pharmacodynamic properties when administered by the usual routes for these types of compounds.

Basically substituted 5H-dibenzo [a,d] - 10,11 - dihydrocycloheptenes have achieved importance as antidepressive agents [J. med. Chem. 7 (1964) pp. 390–392; J. med. Chem. 7, 88–94 (1964); J. med. Pharm. Chem. 4, 411–416 (1961)].

Basically substituted oximes of 5H-dibenzo [a,d]-10,11-dihydro-cycloheptenylidene, however, have not heretofore been disclosed or described in the literature. It has now been found that these substituted oximes of the formula:

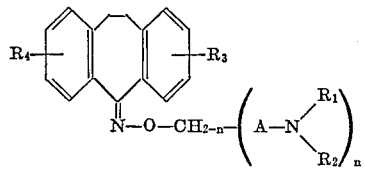

in which A is a branched or straight alkylene chain of 0–6 carbon atoms, $R_1$ and $R_2$ are each hydrogen or an alkyl radical of 1–8 carbon atoms, which may be linked with one another or with A, as via a hetero atom such as N, S or O, $R_3$ and $R_4$ are each hydrogen, alkyl groups of 1–4 carbon atoms, halogen, hydroxyl, nitro or amino, and $n$ is 1 or 2, have valuable and useful pharmacological properties.

In animal experiments, these compounds as such or in the form of their salts with non-toxic pharmaceutically acceptable inorganic or organic acids possess strong anti-cataleptic activity against pharmacogenically initiated extrapyramidal-motoric irritations.

They are also active in various animal experiments which give indications of the quality of their antidepressive (thymoleptic) activity in human beings.

The compounds have moreover a strong spasmolytic effect in vitro.

Non-toxic pharmaceutically acceptable acids which are suitable for salt formation are, e.g. acetic acid, propionic acid, lactic acid, maleic acid, fumaric acid, succinic acid, tartaric acid, citric acid, salicylic acid, naphthalene-1,5-disulphonic acid, phosphoric acid, hydrochloric acid, and the like.

It has further been found that the new compounds can be produced by either reacting a 5H-dibenzo [a,d]-10,11-dihydrocycloheptene of the formula:

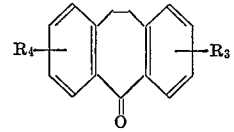

with a hydroxylamine of the formula:

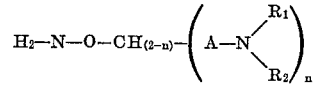

or first converting with hydroxylamine into an oxime of the formula:

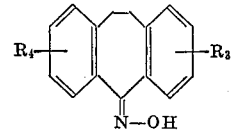

and then allowing the same to react, in the form of a suitable metal salt, with a halide of the formula:

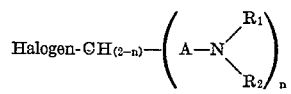

In these formulae, A, $R_1$, $R_2$, $R_3$, $R_4$ and $n$ have the meanings set forth above.

EXAMPLE 1

2.08 grams of 5H-dibenzo [a,d]-10,11-dihydro-cycloheptene-5-one and 1.5 ml. of β-diethylamine-ethoxyamine are dissolved in 2 ml. of methanol. Methanolic hydrochloric acid is added until a pH of 3–4 is reached and the mixture is boiled under reflux overnight. The reaction mixture is then evaporated to dryness, the residue is triturated with ether and filtered off with suction. The solid residue is dissolved in water, the solution rendered alkaline and the precipitated oil is separated and converted into the hydrochloride in ether with ethereal hydrochloric acid. The hydrochloride of 5H-dibenzo[a,d]-10,11-dihydro-cycloheptenylidene-5-β-diethylamino ethoxy amine is finally purified by recrystallization from acetone. (M.P. 169–171°C.)

EXAMPLE 2

1.15 g. of sodium are dissolved in 100 ml. of absolute ethanol. There are added thereto portionwise 11.2 g. of 5-oximino-5H-dibenzo (a,d)-10,11-dihydro-cycloheptene and boiled briefly. Thereafter 6.4 g. of β-dimethylamino-ethyl-chloride are introduced dropwise and boiled for 4 hours under reflux. The solvent medium is removed and the residue is taken up in benzene and reduced to dryness by concentration. The residue is again dissolved in benzene and chromatographed on aluminum oxide according to Brockmann. The first benzene fraction contains 7 g. of 5H-dibenzo (a,d)-10,11-dihydro-cycloheptenylidene-5-β-dimethylamino ethoxy amine, the hydrochloride of which is precipitated from acetone with ethereal hydrochloric acid. The salt melts at 185–187° C. after it is dissolved and allowed to crystallize from acetone/ether.

Similarly, there are obtained the hydrochlorides of the following compounds:

5H-dibenzo(a,d)-10,11-dihydro-cycloheptenylidene-5-
β-dimethylamino-β-methyl ethoxy amine of M.P. 160–161° C.
5H-dibenzo(a,d)-10,11-dihydro-cycloheptenylidene-5-
γ-dimethylamino propoxy amine of M.P. 194–195° C.
5H-dibenzo(a,d)-10,11-dihydro-cycloheptenylidene-5-
β-piperidino ethoxy amine of M.P. 160–161° C. and
5H-dibenzo(a,d)-10,11-dihydro-cycloheptenylidene-5-
γ-morpholino-β-dimethyl propoxy amine of M.P. 164–167° C.

The γ-morpholino-β-dimethyl-propyl chloride used in the preparation of the last named compound is prepared from α-dimethyl β-morpholino-propionaldehyde by catalytic hydrogenation and then the resulting aminoalcohol is converted into the basic chloride.

Further compounds obtained according to Example 2 are the hydrochlorides of 5H-dibenzo-(a,d)-10,11-dihydro-cycloheptenylene-5-γ-dimethylamino-β-methyl propoxy amine of M.P. 181° C.;
5H-dibenzo-(a,d)-10,11-dihydro-cycloheptenylidene-5-γ-piperidino propoxy amine of M.P. 225 to 226° C.;
5H-dibenzo-(a,d)-10,11-dihydro-cycloheptenylidene-5-γ-N-methyl-piperazino propoxy amine of M.P. 239 to 240° C.; and
5H-dibenzo-(a,d)-10,11-dihydro-cycloheptenylidene-5-γ-diethyl-amino propoxy amine of M.P. 185° C.

EXAMPLE 3

1.3 g. of sodium are dissolved in 150 ml. of absolute ethanol. There are added thereto 11.2 g. of 5-oximino-5H-dibenzo(a,d)-10,11-dihydro-cycloheptene. There is then introduced a solution of 6.5 g. of methyl-amino-ethylchloride in absolute ethanol with stirring for one hour at room temperature. This is warmed overnight at 60° C. and finally boiled for 1½ hours under reflux. The product is suction filtered, the filtrate evaporated and the residue treated with cyclohexane. The cyclohexane extract is mixed with ethereal hydrochloric acid and the precipitated hydrochloride of 5H-dibenzo-(a,d)-10,11-dihydro-cycloheptenylidene - 5 - β-methylamino ethoxy amine melts at 196° C. after decantating the solvent and recrystalizing from acetone.

What is claimed is:
1. 5H - dibenzo[a,d]-10,11-dihydro-cycloheptenylidene 5-β-piperidino ethoxy amine or the hydrochloride salt thereof.
2. 5H - dibenzo[a,d]-10,11-dihydro-cycloheptenylidene 5-γ-morpholino-β-dimethyl-propoxy amine or the hydrochloride salt thereof.
3. 5H - dibenzo[a,d]-10,11-dihydro-cycloheptenylidene 5-γ-piperidino-propoxy amine or the hydrochloride salt thereof.
4. 5H - dibenzo[a,d]-10,11-dihydro-cycloheptenylidene 5-γ-N-methyl-piperazino-propoxy amine or the hydrochloride salt thereof.

References Cited

UNITED STATES PATENTS 3,270,055   8/1966   Engelhard et al. _____ 260—566

ALEX MAZEL, Primary Examiner

J. TOVAR, Assistant Examiner

U.S. Cl. X.R.

260—268, 294.7; 424—248, 267, 250

PO-1050
(5/69)

UNITED STATES PATENT OFFICE
CERTIFICATE OF CORRECTION

Patent No. 3,505,321          Dated April 7, 1970

Inventor(s) Siegismund Schutz and Friedrich Hoffmeister

It is certified that error appears in the above-identified patent and that said Letters Patent are hereby corrected as shown below:

In the heading please insert

--Claims priority, application Germany,
F44539 IVb/12 O, filed November 26, 1964--

SIGNED AND
SEALED
AUG 25 1970

(SEAL)
Attest:

Edward M. Fletcher, Jr.
Attesting Officer

WILLIAM E. SCHUYLER, JR.
Commissioner of Patents